No. 833,418. PATENTED OCT. 16, 1906.
A. RÜCKL.
FISH CULTURE TANK.
APPLICATION FILED APR. 19, 1906.
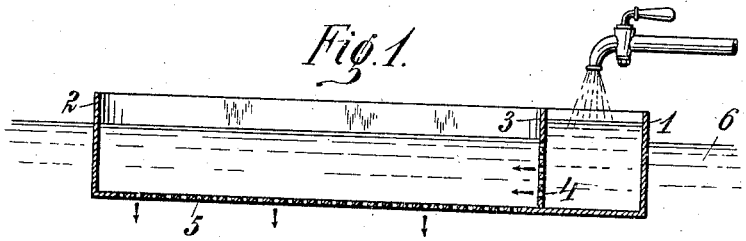
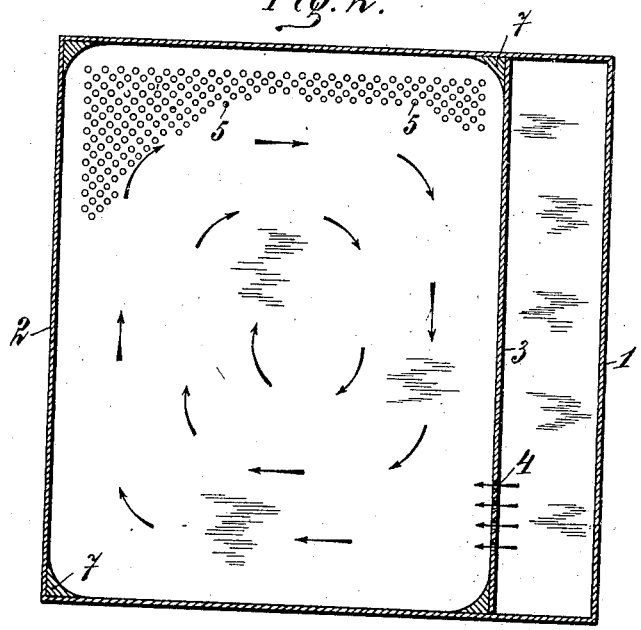
Witnesses:—
C. M. Crawford
L. Waldman
Inventor
Antonín Rückl
by B. Singer
Attorney

UNITED STATES PATENT OFFICE.

ANTONIN RÜCKL, OF NOVÉ MITROVICE, AUSTRIA-HUNGARY.

FISH-CULTURE TANK.

No. 833,418.　　　Specification of Letters Patent.　　　Patented Oct. 16, 1906.

Application filed April 19, 1906. Serial No. 312,728.

*To all whom it may concern:*

Be it known that I, ANTONIN RÜCKL, a subject of the Emperor of Austria-Hungary, residing at Nové Mitrovice, Bohemia, Austria-Hungary, have invented a certain new and useful Fish-Culture Tank, of which the following is a specification.

This invention relates to improvements in tanks for fish culture, and has for its object the provision of a tank wherein the incoming water is given a rotary or circular flow prior to its discharge.

The invention consists in the provision of a tank divided by a partition or the like into water-supply and spawning sections and in the provision of apertures so arranged in the partition as to cause the water passing from the supply to the spawning sections to travel in a circular or a rotary manner while in the spawning-section.

The invention also consists in the provision of suitable outlets for the spawning-section so disposed with respect to the inlets as to facilitate or to assist in inducing such rotary flow.

The invention will be more fully described in connection with the accompanying drawings and will be more particularly pointed out and ascertained in and by the appended claims.

In the drawings, Figure 1 is a horizontal sectional view of a tank embodying the main features of my invention. Fig. 2 is a plan view thereof.

Like numerals of reference designate similar parts throughout the drawings.

As shown, the tank is disposed within a body of water 6 and is provided with a suitable water-supply—such, for instance, as the faucet shown. The tank preferably consists of a rectangular structure divided by a partition 3 into a supply-section 1 and a spawning-section 2. The partition is so disposed within the tank that the division thereof is unequal, the spawning-section 2 being relatively enlarged with respect to the supply-section 1. The partition 3 is provided with apertures 4, grouped at one point, preferably at one end of the partition, to admit the passage of water from the supply to the spawning section. The spawning-section is provided with apertures 5, preferably in the bottom wall thereof, to permit discharge of the water, and, as shown, said discharging-apertures are located at a point remote from the apertures 4. Each of the corners of the spawning-section, when the same is rectangular, is provided with fillets 7.

The operation is as follows: As the water passes through the apertures 4 it is caused to flow in a circular course, as shown by the arrows, through the spawning-section, thereby effecting ample aeration and efficient washing of the eggs and affording considerable space for hatched spawn to collect and feed without being drawn toward the outlets 5. The rounded corners 7 serve effectively to prevent refuse and foreign matter from collecting in the spawning-section and also facilitate the circular flow of the water therein. After the water has described one or more circular courses in the spawning-section, it is gradually thrust toward the apertures 5 and discharged.

I claim—

1. An incubator for fish-eggs comprising a tank, a partition dividing said tank into a water-supply section and a spawning-section, said partition having perforations grouped at a single point to induce a circular flow of water in the spawning-section.

2. An incubator for fish-eggs comprising a tank, a partition dividing said tank in a relatively small supply-section and a relatively large spawning-section, said partition having apertures at one end and said spawning-section having apertures at the opposite end of said tank for inducing a circular flow of the water in the spawning-section.

3. An incubator for fish-eggs comprising a tank, a partition dividing said tank into a water-supply section, and a spawning-section, and means associated with said partition and serving to induce a circular flow of the water in the spawning-section.

In testimony whereof I affix my signature in presence of two witnesses.

ANTONIN RÜCKL.

Witnesses:
　ADOLPH FISCHER,
　LADISLAV VOJÁREK.